United States Patent [19]

Deacon et al.

[11] Patent Number: 5,282,063

[45] Date of Patent: Jan. 25, 1994

[54] METHOD AND APPARATUS FOR AUTOMATIC BRIGHTNESS AND CONTRAST CONTROL IN AN IMAGE CAPTURE SYSTEM

[75] Inventors: John J. Deacon; Albert D. Edgar, both of Austin, Tex.

[73] Assignee: International Business Machines Corporation, Armonk, N.Y.

[21] Appl. No.: 926,552

[22] Filed: Aug. 6, 1992

Related U.S. Application Data

[63] Continuation of Ser. No. 368,441, Jun. 19, 1989.

[51] Int. Cl.⁵ .............................................. H04N 1/04
[52] U.S. Cl. .................................... 358/479; 358/169
[58] Field of Search ...................... 358/479, 168, 169; H04N 1/04

[56] References Cited

U.S. PATENT DOCUMENTS 3,790,706  2/1974  Gubala et al. ...................... 358/169
4,799,106  7/1989  Moore et al. ....................... 358/169
4,962,425  10/1990  Rea ..................................... 358/168

Primary Examiner—Stephen Brinich
Attorney, Agent, or Firm—Andrew J. Dillon

[57] ABSTRACT

A method and apparatus are disclosed for automatic brightness and contrast control in a digital image capture system. A video camera is utilized to scan an image and generate an analog output signal indicative thereof which is utilized to create rows and columns of picture elements. The image is initially scanned utilizing a trial brightness and contrast level and then analyzed to determine the number of saturated picture elements within the scanned image. Thereafter, the brightness and contrast levels are adjusted so that the number of saturated picture elements tends toward a selected small number. In a preferred embodiment of the present invention, the analog output signal is digitized and each picture element created therefrom has a digital value associated therewith. Analysis of the scanned image is accomplished by counting the number of picture elements having a selected digital value. Additionally, once the brightness and contrast levels have been adjusted to substantially achieve the desired number of selected picture elements the signal level is increased by the amount of one digital state at each end of the spectrum to avoid wasting the final digital state at each saturated state.

19 Claims, 2 Drawing Sheets

METHOD AND APPARATUS FOR AUTOMATIC BRIGHTNESS AND CONTRAST CONTROL IN AN IMAGE CAPTURE SYSTEM

This application is a continuation, of application Ser. No. 368,441, filed Jun. 19, 1989.

BACKGROUND OF THE INVENTION

1. Technical Field

The present invention relates in general to image capture systems and in particular to digital image capture systems. Still more particularly, the present invention relates to digital image capture systems which automatically adjust brightness and contrast to achieve an optimum image reproduction.

2. Background Art

Digital image capture systems are well known in the prior art. Such systems typically include a video scanning device such as a camera and a digital system such as a personal computer. By utilizing these two devices together in conjunction with a suitable interconnection it is possible to capture and store an image within the memory of a computer and thereafter utilize that image in conjunction with presentations or to create additional copies of that image at a later time.

One problem which is associated with such image capture systems is the determination of the brightness and contrast setting which will be utilized to capture a particular image. Each point within an image to be captured has a brightness level which is located somewhere within a grayscale. The darkest point in an image may not reach full black and the brightest point within an image may not reach full white. Known image capture systems translate this brightness at various points throughout the image into a voltage where black and white represent selected points on a continuous voltage scale.

Since known image capture systems generally store the image as a plurality of digital values it is necessary to convert the continuous analog voltage which represents the brightness of the image to a plurality of digital values for each point within the image. Generally, the number of possible digital values which may be assigned to a particular point within an image is a function of the hardware which is utilized to convert the analog signal to a digital signal. These digital numbers must be accurately assigned throughout the range of possible analog voltages in order to obtain an optimum image. For example, digital values should not be assigned to analog voltages which are beyond those which occur in the image. Similarly, if all of the digital values are compressed to the point where they do not accurately represent the full dynamic voltage range of the image some of the detail in the image will not be captured.

Attempts to solve this problem are well known in the art. For example, "electric eye" cameras have been present in the photographic art for a generation. These cameras work by setting the middle of a fixed grayscale index to the average brightness of a particular scene. The limitations of this particular approach are well known. For example, if you aim an automatic video camera at a bride in a white gown against a white altar the resultant image will depict a bride in gray against a gray altar. Similarly, if you aim an automatic video camera at a photograph of fireworks against a black sky, every wrinkle within the photographic paper will be visible but the fireworks will be grossly washed out.

Those skilled in the art will appreciate that exposing an image in response to the average brightness of that image works only approximately and only under certain conditions.

In recognition of this short fall several modern photographic camera metering systems have been proposed which utilize a group of multiple sensors, each of which views a different region within a scene or image to be captured. The results of these multiple readings are then utilized as a pointer within a large memory device. Within the large memory device are stored the research results of thousands of different photographic situations. Theoretically, these situations take into account relative differences, absolute image brightness and camera orientation. While this system works much better than a simple average brightness system it is not perfect and may be mislead.

While the foregoing description of the prior art describes these systems in terms of black and white images, those skilled in the art will appreciate that color image systems experience similar problems. Indeed, brightness and contrast for each of the three primary colors must be adjusted correctly in order to obtain a quality color image reproduction. In a color system each of the three primary colors includes a "white level adjustment" and a "black level adjustment" which is utilized to set the voltage limits of the analog voltage representing image brightness to a digital number conversion. These adjustments must be repeated for each of the three primary colors, for a total of six adjustments. In the color image art these adjustments are often referred to in terms of the primary color associated therewith such as "red white level" or "green black level." It is very difficult for even an expert user to handle all six variables and the above-described prior art automatic adjustment systems are very often fooled into incorrect color settings.

In view of the above, it should be apparent that a need has existed for a method and apparatus wherein the brightness and contrast level in an image capture system may be accurately and rapidly determined in order to produce an accurate reproduction of an image.

SUMMARY OF THE INVENTION

It is therefore one object of the present invention to provide an improved image capture system It is another object of the present invention to provide an improved digital image capture system.

It is still another object of the present invention to provide an improved digital image capture system which automatically adjusts brightness and contrast to achieve an optimum image reproduction.

The foregoing objects are achieved as is now described. A method and apparatus are disclosed for automatic brightness and contrast control in a digital image capture system. A video camera is utilized to scan an image and generate an output signal indicative thereof which is utilized to create rows and columns of picture elements. The image is initially scanned utilizing a trial brightness and contrast level and then analyzed to determine the number of saturated picture elements within the scanned image. Thereafter, the brightness and contrast levels are adjusted so that the number of saturated picture elements tends toward a selected small number. In a preferred embodiment of the present invention, the output signal is digitized and each picture element has a digital value associated therewith. Analysis of the scanned image is accomplished by counting the number of picture elements having a selected digital value. Additionally, once the brightness and contrast levels have been adjusted to substantially achieve the desired number of selected picture elements the digital states are adjusted to more fully utilize the end states.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
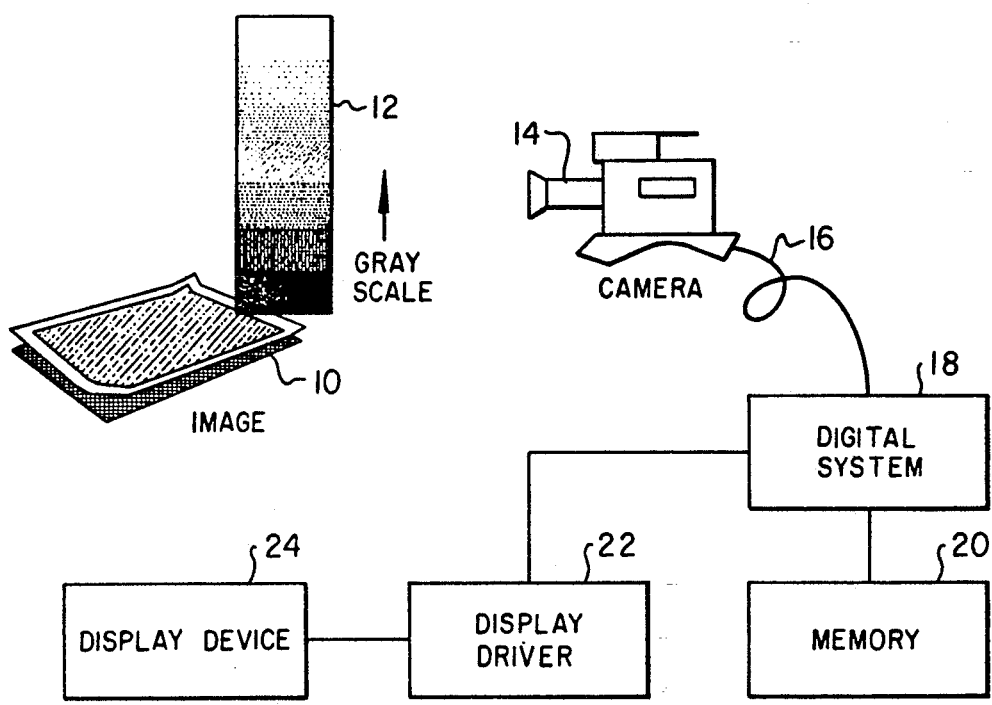
FIG. 1 is a block diagram representation of an image capture system in accordance with the method of the present invention.

With reference now to the figures, and in particular with reference to FIG. 1, there is depicted a block diagram representation of an image capture system which may be provided in accordance with the method of the present invention. As may be seen, FIG. 1 includes an image 10 which includes a plurality of points therein, each of which will possess a brightness level which corresponds to a point on grayscale 12. Image 10 is preferably scanned by an image capture device, such as camera 14, which will generate an analog output voltage associated with the brightness level of each point within image 10.

The analog output voltage of camera 14 is then coupled, via line 16, to digital system 18. Those skilled in the art will appreciate that digital system 18 may comprise any digital system capable of converting the analog output voltage of camera 14 into corresponding digital values and thereafter manipulating those values. For example, digital system 18 may comprise a personal computer, such as the Model PS/2, manufactured by International Business Machines Corporation of Armonk, N.Y. Preferably included within digital system 18 is an image capture card (not shown) which is utilized to translate the analog voltage output of camera 14 into a series of discrete digital numbers. As discussed above, a limited number of discrete digital numbers are generally available and it is therefore important that no discrete digital number be assigned to a corresponding analog voltage level which is not reached within the image. Additionally, if the range of digital representations does not cover the full analog voltage range of the output signal from camera 14 then some of the detail of image 10 will be lost.

The digital representations of each picture element within the scanned representation of image 10 may then be stored in memory 20 for additional processing in a manner well known in the art. After the electronic representation of image 10 has been captured and processed in accordance with the method of the present invention, the picture elements thus generated may be coupled to display driver 22 and utilized to generate an electronic image by means of display device 24.

Still referring to FIG. 1, the method of the present invention may be described with regard to certain general rules in the image capture art. For example, in every monochrome image the human eye wishes to see at least one point of pure black and at least one point of pure white. This is true due to the fact that an image with no black points will look faded while an image with no white points will look muddy. On examination, a pleasingly "misty" picture or image will often have a small point of black somewhere in the foreground while a pleasingly "dark and moody" picture will generally have a small point of white. If the aforementioned points are removed the remaining picture will revert to being characterized as faded or muddy.

Similarly, in each color image the human eye wishes to see some point of pure "black" and some point of pure "white" in each of the three primary colors. In view of the above, the method of the present invention begins by finding the brightest and darkest point within image 10 for each primary color. Thereafter, digital system 18 is utilized to set that color's white and black levels to those points. This is accomplished by actually capturing an image utilizing a trial brightness and contrast level for each color. Thereafter, the captured image is analyzed to determine whether or not the brightness and contrast levels are correctly set and if not, the process is repeated until the captured image is correct.

One simple approach to the foregoing involves the scanning of each picture element within the captured image and a determination of whether or not any color component of a picture element within the captured image is saturated black. In the event any color component of a picture element within the captured image is saturated black, the black level of that color is decreased to encompass a wider range. If no color component of a picture element exists within the captured image which is saturated black, the black level is increased. To adjust contrast, if any color component of a picture element within the captured image is saturated white, the white level of that color is increased. If no color component of a picture element exists within the image which is saturated white, the white level will be decreased.

Additionally, the Applicants have discovered that an accurate image representation may be prepared without examining each color component of each picture element within the captured image. For example, the picture elements which are located at the edge of the image should generally be excluded to avoid anomalies which may occur due to the proximity of the sync pulses or the proximity of the edge of the sensors within camera 14. The processing time of digital system 18 is mostly utilized in counting picture elements and therefore the process may be speeded up by initially examining only a selected subsample of picture elements. For example, every eighth picture element horizontally and every fourth picture element vertically. As the iterations in route to the proper black level and white level become finer, more picture elements should be included to increase accuracy.

Figure 2:
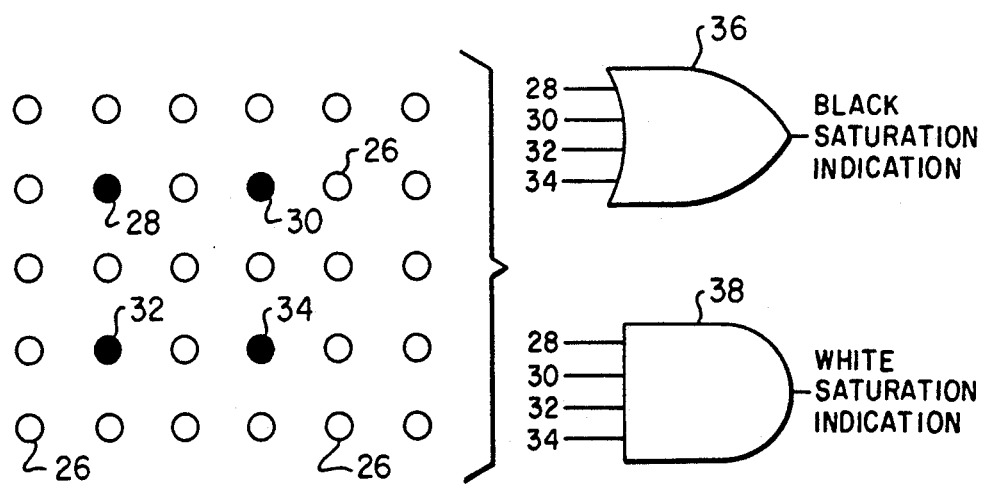
FIG. 2 is a schematic representation of a picture element analysis system in accordance with the method of the present invention.

Referring now to FIG. 2, there is depicted a schematic representation of a picture element analysis system which may be utilized in accordance with the method of the present invention. As may be seen, each electronic image which is captured utilizing the system of FIG. 1 is created by a plurality of rows and columns of picture elements or pixels 26. In order to accommodate for peaking, the white or black saturation test in accordance with the method of the present invention is generally applied to groups of picture elements. Elements in the group must be saturated for the group to be considered saturated. Thus a narrow edge enhancement smaller than the size of the group will be ignored. To accommodate the majority of video cameras that apply both horizontal and vertical peaking, these picture elements should cover an area extending both horizontally and vertically. The simplest structure having this characteristic is four pels laid at the corners of a box such as picture elements 28, 30, 32 and 34. However a three pel structure works also and a two pel structure works for one axis. The vertical enhancement circuitry utilized with most video cameras utilizes an interlaced image. Therefore the peaking will extend over alternate lines, thus, the group of picture elements which is chosen for analysis is spread out by alternate picture elements as illustrated in FIG. 2.

In accordance with the method of the present invention, the group of selected picture elements is said to be saturated (either black or white) for a color, if most or all picture elements within the group are saturated. Those skilled in the art will appreciate that the most direct manner to test for saturation of each color component of each picture element within the group is to test saturation on each picture element individually. The Applicants have determined that a much more rapid approach may be accomplished by combining the picture elements in each group together in a logical OR to test for black saturation. By combining the binary numbers representing the color components of each picture element utilizing an OR gate, such as gate 36, the output will be a logical zero only if the binary numbers representing each color component of the picture elements individually were all zeroes.

Similarly, the binary numbers representative of the color component of each of the four picture elements may be combined in a logical AND to test for white saturation. By coupling the binary numbers representative of each color component of each of the four picture elements to an AND gate, such as gate 38, the output will be a logical one only if all of the binary numbers of each color component of each of the picture elements individually were all logical ones. This approach is much more rapid due to the fact that all three color components occupy different bits in a single memory word in most systems. By combining individual picture elements in a logical AND or OR it is possible to do much of the processing in parallel between the three primary colors.

Figure 3:
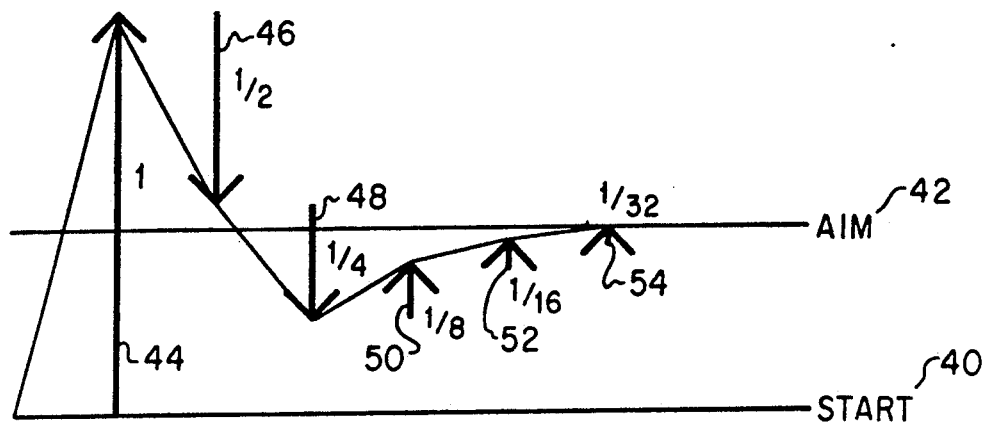
FIG. 3 is a graphic representation of one method in which the brightness and contrast levels may be adjusted in accordance with the method of the present invention.

With reference now to FIG. 3, there is depicted a graphic representation of one method in which the brightness and contrast levels may be adjusted in accordance with the method of the present invention. As may be seen, FIG. 3 includes a graphic representation of a line 40 which represents the initial trial brightness and contrast level which is set by digital system 18 (see FIG. 1). Line 42 represents the desired brightness and contrast level wherein a selected number of picture elements within the captured image will be saturated black or white. The Applicants have discovered that by setting this desired value to that level which results in a single picture element reaching saturation, the resultant image will have weak black and white levels. Therefore, the selected brightness and contrast levels are chosen such that the captured image will result in a selected number of picture elements reaching saturation. This selected number is generally preferred to be in the six to twelve picture element range.

Line 44 within FIG. 3 is utilized to depict a situation in which a larger number than the desired number of picture elements has reached saturation. In accordance with a simple adjustment scheme the trial brightness and contrast level is then reduced by an amount equal to one-half of the previous step size. Thereafter, a subsequent analysis of the number of picture elements which have reached saturation indicates that the number of picture elements in saturation is still greater than desired. Line 48 represents the next adjustment which is again one-half of the previous adjustment amount. An analysis at this point indicates that too few picture elements are in a saturated state and the trial brightness and contrast level is therefore increased an amount equal to one-half of the previous adjustment amount. Those skilled in this art will appreciate that in an ideal environment the magnitude of the adjustment may be decreased by one-half at each iteration and the trial brightness and contrast level will eventually converge to a point at or near the desired level.

In a practical system where there is interaction between the variables, noise within the system or drifting of the aim values the convergence may not operate ideally. In such systems the convergence may be made more robust by halting the division by two after several iterations in the same direction. If the next sample after this point does not reverse direction, the system has drifted and the step size can be made to increase each cycle until the direction finally changes.

Of course, those skilled in the art will appreciate that there are many different techniques whereby the black and white levels may be modified to result in the desired number of picture elements reaching a saturated state. For example, it is possible to capture an image at three different level settings and count the number of saturated picture elements which existed at each of those settings. A linear regression may thereafter be utilized to estimate the desired level setting which will give a selected saturated picture element count.

Figure 4:
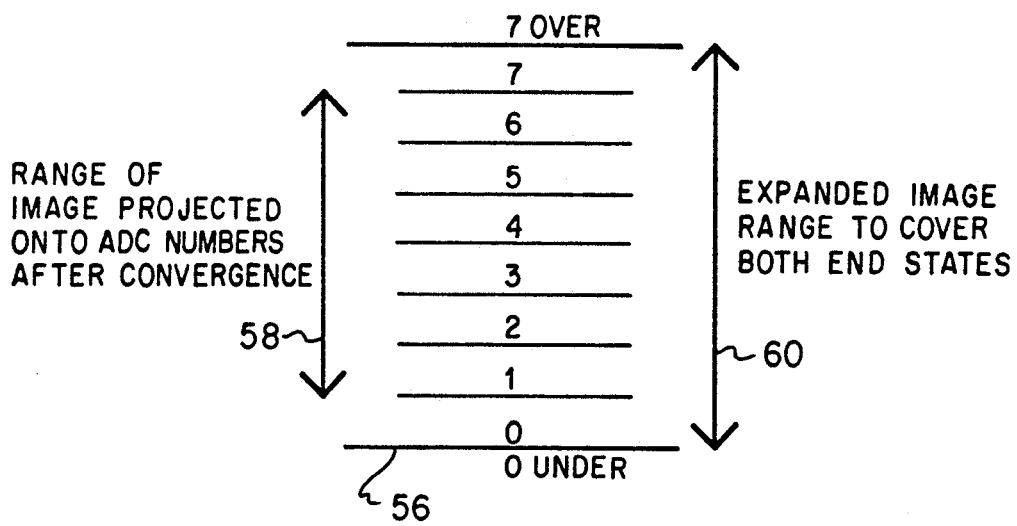
FIG. 4 is a graphic representation of a method for adjusting the quantum steps of brightness and contrast in accordance with the method of the present invention.

Referring now to FIG. 4, there is depicted a graphic representation of a method for adjusting the quantum steps of brightness and contrast in accordance with the method of the present invention. As should be appreciated by those skilled in the image capture art, the convergence algorithms discussed above will find the black and white levels for each color which result in a very small number of pure white and black levels within each color. As discussed above, the depicted embodiment of the present invention attempts to locate a black and white level which will result in a selected small number of saturated picture elements, that is, between six and twelve picture elements in the saturated state. This mode of operation is necessary to locate a particular black or white level due to the fact that once a picture element has reached a black or white state there is no practical method of knowing from the binary characterization of that picture element just how far the picture element is saturated.

Thus, if the black and white levels achieved by the convergence algorithms discussed above are left at the initial solution two quantum states of black and white level are almost entirely wasted. This is illustrated with regard to FIG. 4 for a hypothetical three bit analog to digital conversion scheme. As may be seen, the various states available in a three bit analog to digital conversion scheme are illustrated at reference numeral 56. Line 58 represents a range of the image projected onto the analog to digital conversion numbers after application of the convergence algorithms discussed above. Thereafter, in accordance with the method of the present invention, the black and white levels within the image capture system disclosed herein are expanded by one full quantum state at each end of the spectrum.

If this technique were not applied, the fraction of the "zero" state which is utilized is the black picture element count, divided by the total picture element count, times the total number of quantum states in the depicted example. Generally this is a fraction which is much smaller than unity. The difference between this fraction and unity is the amount of the "zero" state which is wasted relative to the other quantum states in the system. By projecting the final black level this amount into saturation for the final solution, and also projecting the final white level one additional state, the two extreme quantum states will be fully utilized, for all three colors.

This technique increases contrast slightly without noticeable saturation and eliminates the tendency for highlights to go green and for shadows to go pink due to different quantum ranges between colors. It should be noted that this final adjustment does not make a fixed fraction of the color components of the picture elements saturated black, but rather will make saturated black cover the final fraction of the grayscale range. If most of the original image was the same shade of black then this final step will make most of the image saturated black, which is exactly what is desired. If the original image contained only a small point of pure black, then this final step will leave very few color components within the picture elements as saturated black, again representing the original image accurately.

Those skilled in the art upon reference to the foregoing will appreciate that the Applicants have provided a method whereby the black level and white level for each of the three colors within a digital color image capture system may be rapidly and automatically adjusted in a manner which provides a more accurate representation of the original image in a manner which will accommodate wide variations in brightness and contrast. Similarly, the algorithm disclosed herein will generate the highest possible gain with minimal clipping and make an extremely accurate technical recording of the image with little or no information loss. Even in those rare cases where the present method fails to give an exact reproduction of the original image it will improve the image which may be obtained utilizing other techniques. It should also be appreciated that this technique may be utilized to quickly establish a base brightness and contrast level which may then be varied by the operator, for example, to further intensify the image.

While the invention has been particularly shown and described with reference to a preferred embodiment, it will be understood by those skilled in the art that various changes in form and detail may be made therein without departing from the spirit and scope of the invention.

We claim:

1. In an image capture system for electronically capturing an image and creating an electronic equivalent thereof comprised of rows and columns of picture elements, a method for automatically adjusting brightness and contrast, said method comprising the steps of:
   setting a trial brightness and contrast level;
   capturing an image utilizing said trial brightness and contrast level;
   analyzing said captured image to determine the number of saturated picture elements therein; and
   automatically modifying said trial brightness and contrast level in response to the analysis of said captured image such that the number of saturated picture elements tends toward a selected number.

2. In an image capture system for electronically capturing an image and creating an electronic equivalent thereof comprised of rows and columns and picture elements, the method for automatically adjusting brightness and contrast according to claim 1 wherein said step of capturing an image utilizing said trial brightness and contrast level comprises the step of scanning said image with a video camera.

3. In an image capture system for electronically capturing an image and creating an electronic equivalent thereof comprised of rows and columns and picture elements, the method for automatically adjusting brightness and contrast according to claim 1 further including the step of digitizing said image captured utilizing said trial brightness and contrast level to obtain a spectrum of digital states ranging from black saturation to white saturation.

4. In an image capture system for electronically capturing an image and creating an electronic equivalent thereof comprised of rows and columns and picture elements, the method for automatically adjusting brightness and contrast according to claim 3 wherein said step of analyzing the captured image to determine the number of saturated picture elements therein comprises the step of analyzing said picture elements within said image to determine the number of picture elements within said image having a selected digital value associated therewith.

5. In an image capture system for electronically capturing an image and creating an electronic equivalent thereof comprised of rows and columns and picture elements, the method for automatically adjusting brightness and contrast according to claim 4 further including the step of expanding the signal range to cover an additional digital state at each end of said spectrum of digital states once said number of saturated picture elements substantially equals said selected number.

6. In an image capture system for electronically capturing an image and creating an electronic equivalent thereof comprised of rows and columns and picture elements, the method for automatically adjusting brightness and contrast according to claim 4 wherein said step of analyzing said picture elements within said image to determine the number of picture elements within said image having a selected digital value associated therewith comprises the step of analyzing only selected picture elements within said image.

7. In an image capture system for electronically capturing an image and creating an electronic equivalent thereof comprised of rows and columns and picture elements, the method for automatically adjusting brightness and contrast according to claim 1 wherein said step of automatically modifying said trial brightness and contrast level such that the number of saturated picture elements tends toward a selected number comprises the step of repeatedly adjusting said trail brightness and contrast level by a fraction of the previous adjustment amount.

8. In an image capture system for electronically capturing an image and creating an electronic equivalent thereof comprised of rows and columns and picture elements, the method for automatically adjusting brightness and contrast according to claim 1 wherein said image capture system is a color system and wherein said step of setting a trial brightness and contrast level comprises the step of setting a trial brightness and contrast for each primary color.

9. In an image capture system for electronically capturing an image and creating an electronic equivalent thereof comprised of rows and columns and picture elements, the method for automatically adjusting brightness and contrast according to claim 1 wherein said step of analyzing said entire captured image to determine the number of saturated picture elements therein comprises the step of analyzing multiple groups of four proximate picture elements and characterizing the group of picture elements as saturated only if all four picture elements are saturated.

10. In an image capture system for electronically capturing an image and creating an electronic equivalent thereof comprised of rows and columns and picture elements, the method for automatically adjusting brightness and contrast according to claim 9 wherein each group of four proximate picture elements comprises a group of four picture elements each separated horizontally and vertically by one additional picture element.

11. An image capture system for scanning an image and creating an electronic equivalent thereof comprised of rows and columns of picture elements, said system comprising:
    camera means for scanning an image and generating an output signal indicative thereof;
    control means for setting a trial brightness and contrast level to be utilized in scanning said image;
    image means coupled to said camera means for generating an electronic image comprised of rows and columns of picture elements in response to said output signal;
    analyzer means coupled to said image means for analyzing said electronic image to determine the number of saturated picture elements within said electronic image; and
    modification means coupled to said analyzer means and said control means for automatically modifying said trial brightness and contrast levels such that the number of saturated picture elements within each image tends toward a selected number.

12. The image capture system for scanning an image and creating an electronic equivalent thereof comprised of rows and columns of picture elements according to claim 11 further including means for digitizing said output signal.

13. The image capture system for scanning an image and creating an electronic equivalent thereof comprised of rows and columns of picture elements according to claim 12 wherein said image means includes means for converting said digitized output signal to a plurality of rows and columns of picture elements each having an associated digital value associated therewith.

14. The image capture system for scanning an image and creating an electronic equivalent thereof comprised of rows and columns of picture elements according to claim 13 wherein said analyzer means comprises means for determining the number of picture elements having a selected digital value associated therewith.

15. The image capture system for scanning an image and creating an electronic equivalent thereof comprised of rows and columns of picture elements according to claim 14 wherein said analyzer means comprises means for determining the number of picture elements having a selected digital value associated therewith from only a selected number of a larger number of picture elements.

16. The image capture system for scanning an image and creating an electronic equivalent thereof comprised of rows and columns of picture elements according to claim 11 wherein said image is a color image and wherein each of said picture elements is comprised of multiple color components and wherein said analyzer means comprises means for determining the number of picture elements which include a saturated color component.

17. In an image capture system for electronically capturing an image and creating an electronic equivalent thereof comprised of rows and columns of picture elements, a method for automatically adjusting brightness and contrast, said method comprising the steps of:
    setting a trial brightness and contrast level;
    capturing an image utilizing said trial brightness and contrast level;
    analyzing a plurality of different subgroups of proximate pixels in said captured image;
    counting the number of said subgroups having saturated pixels equal to or exceeding a preselected first number; and
    automatically modifying said trial brightness and contrast level as a function of said number of counted subgroups.

18. The method of claim 17 wherein said number of proximate pixels in each of said subgroups is at least three.

19. The method of claim 17 wherein said preselected first number is equal to the number of proximate pixels in each said subgroup.

* * * * *